Jan. 16, 1962    W. W. HECKETHORN    3,016,605
METHOD OF MAKING A HOSE NOZZLE
Filed Feb. 12, 1960
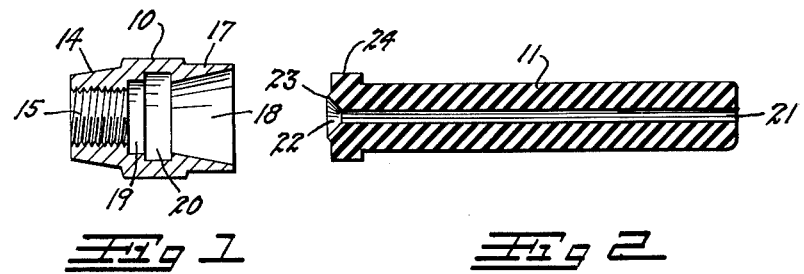
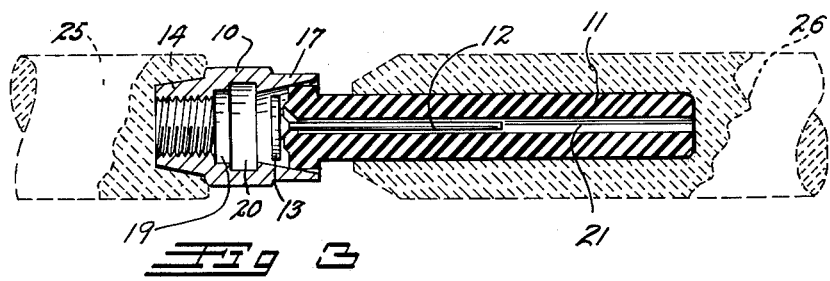
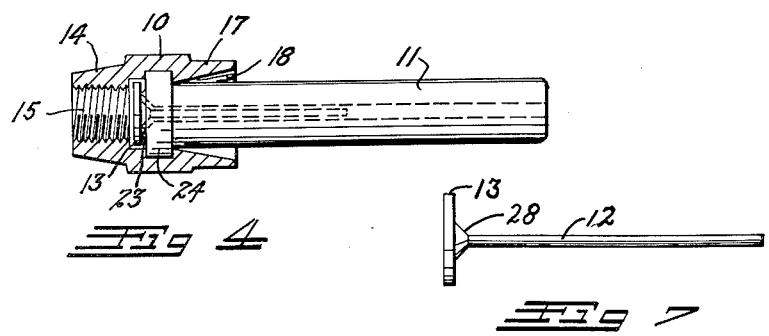
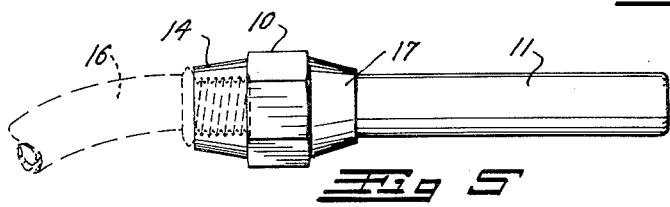
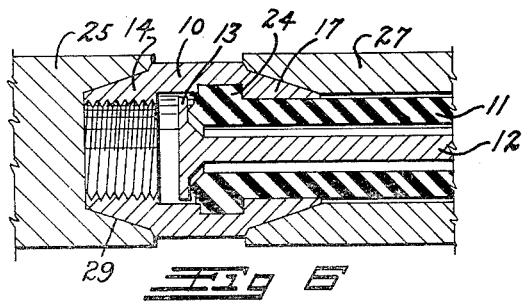
INVENTOR.
WILLIAM W HECKETHORN
BY
ATTORNEY United States Patent Office 3,016,605
Patented Jan. 16, 1962

3,016,605
METHOD OF MAKING A HOSE NOZZLE
William W. Heckethorn, Rte. 1, Box 19, Littleton, Colo.
Filed Feb. 12, 1960, Ser. No. 8,372
1 Claim. (Cl. 29—453)

This invention relates to a hose nozzle more particularly of the flexible type having a control valve which is opened by simple flexure of the nozzle and to a method and means for manufacturing the nozzle.

The principal object of the invention is to provide a highly efficient nozzle of this type formed from three relatively simple parts which can be rapidly and economically manufactured in quantity at a minimum of cost.

Another object is to provide an exceedingly economical, flexible, valved, hose nozzle for use on either air or water hoses which will be leak-proof both externally and internally and in which the valve can be operated with a minimum of manual effort to provide any desired flow through the nozzle.

A further object is to provide a method of manufacturing a nozzle of this character wherein the improved nozzle can be quickly, easily and permanently assembled for use in two simple manufacturing steps.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a longitudinal, diametric section through a housing employed on the improved nozzle showing the housing as it would appear prior to assembly;

FIG. 2 is a similar longitudinal section through a flexible nozzle tube employed in the improved nozzle;

FIG. 3 is a similar section illustrating a preliminary step in assembling the nozzle tube of FIG. 2 into the housing of FIG. 1;

FIG. 4 illustrates the nozzle tube positioned in the housing by the step of FIG. 3;

FIG. 5 is a side view of the completed nozzle illustrating, in broken line, a hose attached thereto;

FIG. 6 is an enlarged fragmentary diametric cross-section through the nozzle illustrating the final manufacturing step; and FIG. 7 is a detail view of a valve disc and stem employed in the improved nozzle.

The improved flexible tilt-valved nozzle consists of three simple parts, to wit, a housing 10, a flexible nozzle tube 11 and a valve stem 12 having a valve disc 13 formed integrally with one extremity thereof.

The housing 10 is preferably turned from hexagonal brass bar stock to form: a tapered hose extremity 14 having an internally threaded nipple socket 15 to receive the terminal nipple of a hose, such as indicated in broken line at 16 in FIG. 5; and a cylindrical tube extremity 17 surrounding an internally conical tube socket 18. The nipple socket 15 terminates within the housing at a circular valve chamber 19 of larger diameter than the threaded nipple socket 15. An annular flange socket 20 is internally turned in the housing between the valve chamber 19 and the conical tube socket 18. The flange socket has a rectangular cross-section and a larger diameter than the valve chamber 19 and the tube socket 18.

The nozzle tube 11 is molded from tough tread stock rubber, or similar flexible material to provide an axial discharge passage 21 the intake extremity of which is tapered to form a conical intake 22 surrounded by an annular, projecting, valve seat bead 23. A rectangular terminal flange 24 surrounds the intake extremity of the nozzle. The terminal flange has an external diameter slightly in excess of the internal diameter of the flange socket 20 and a width slightly in excess of the width of the flange socket 20.

The valve stem 12 with its circular valve disc 13 are die cast or turned from a unitary bar, the stem having a diameter to fit loosely within the discharge passage 21 and the disc 13 having a diameter to fit loosely within the valve chamber 19 and a thickness of substantially one-sixth the width of the chamber 19 so as to be free to tilt in the chamber away from its valve seat. The stem 12 and the disc 13 are joined by a conical tapered portion 28 which fits within the conical intake cavity 22 of the nozzle tube 11.

The improved nozzle is assembled by placing the valve stem in the intake extremity of the nozzle tube 11 and inserting the latter extremity into the conical tube socket 18 of the housing as shown in FIG. 3. The housing is held in any suitable anvil device such as indicated in broken line at 25 and a plunger is fitted over the nozzle tube 11 as indicated in broken line at 26. Pressure is exerted between the anvil device 25 and the plunger 26 in a suitable conventional arbor press or the like. This forces the flange 24 into the tapered tube socket 18 imparting a radial compression to the flanged extremity of the nozzle tube sufficient to allow it to pass through the smallest diameter portion of the socket and into the flange cavity 20 where it will snap radially outward to completely fill the cavity, as shown in FIG. 4. Since the flange 24 is of slightly larger diameter and width than the flange cavity 20, it will exert an expansive sealing contact with the walls of the cavity to permanently stop external leakage.

The plunger 26 is now replaced by a forming die 27, see FIG. 6, having a conical die cavity 29 and axial pressure is exerted to cause the conical cavity 29 to deform the tube extremity 17 of the housing inwardly until the inner wall of the tube socket 18 snugly engages the nozzle tube 11 as shown in FIG. 6.

Fluid pressure from the hose 16 forces the valve disc tightly against the annular valve seat bead 23 to prevent flow through the nozzle. If the housing 10 be gripped in the hand, the nozzle tube can be bent sidewardly with the thumb to swing the valve stem 12 sidewardly. This causes the valve disc 13 to tilt from its seat in the valve chamber 19 to allow free flow through the nozzle as is customary with "flex-tip" nozzles of this type.

The conical tapered portion 28 on the valve stem is of importance in obtaining a relatively quick wide opening of the valve. It has been found that the initial tilting movement of the disc causes the tapered surface of the tapered portion 28 to slide along the inclined wall of the conical intake cavity 22 so as to force the entire valve disc away from valve seat bead throughout the entire circumference of the latter to provide a maximum valve opening.

While a specific form of the improvement has been described and illustrated herein, it is to be understood that the same may be varied within the scope of the appended claim, without departing from the spirit of the invention.

Having thus described the invention what is claimed and desired to be secured by Letters Patent is:

A method of manufacturing a hose nozzle of the type having a housing with a rear hose-receiving extremity and a forward tube-receiving extremity and a flexible nozzle tube extending from said tube forward extremity with a terminal flange surrounding the rear extremity of said nozzle tube and imbedded in an annular flange cavity in said housing comprising: forming a tapered funnel-like tube socket of less diameter than said flange cavity on the forward tube-receiving extremity of said housing concentric of and communicating with said flange cavity; forcing the terminal flange of said nozzle tube rearwardly into said tube socket so that the taper of the latter will impart diametric compression to said flange; continuing said forcing until said flange enters and expands in said flange cavity; and thence pressing said tube socket diametrically inward about said nozzle tube, said tube socket being initially formed with a cylindrical outer surface and a conical inner surface, said pressing deforming said socket to form a cylindrical inner surface and a conical outer surface.

References Cited in the file of this patent

UNITED STATES PATENTS

| | | |
|---|---|---|
| 402,627 | Smith | May 7, 1889 |
| 1,778,244 | Cadden | Oct. 14, 1930 |
| 2,015,923 | Davis | Oct. 1, 1935 |
| 2,149,584 | Davis | Mar. 7, 1939 |
| 2,623,790 | Smith | Dec. 30, 1952 |
| 2,785,016 | Vollertzen et al. | Mar. 12, 1957 |
| 2,795,041 | Klinksiek et al. | June 11, 1957 |
| 2,832,130 | Harvey | Apr. 29, 1958 |